Feb. 27, 1934.  H. A. BRASSERT  1,948,695
METHOD AND APPARATUS FOR THE PRODUCTION OF MOLTEN STEEL
Filed June 15, 1931
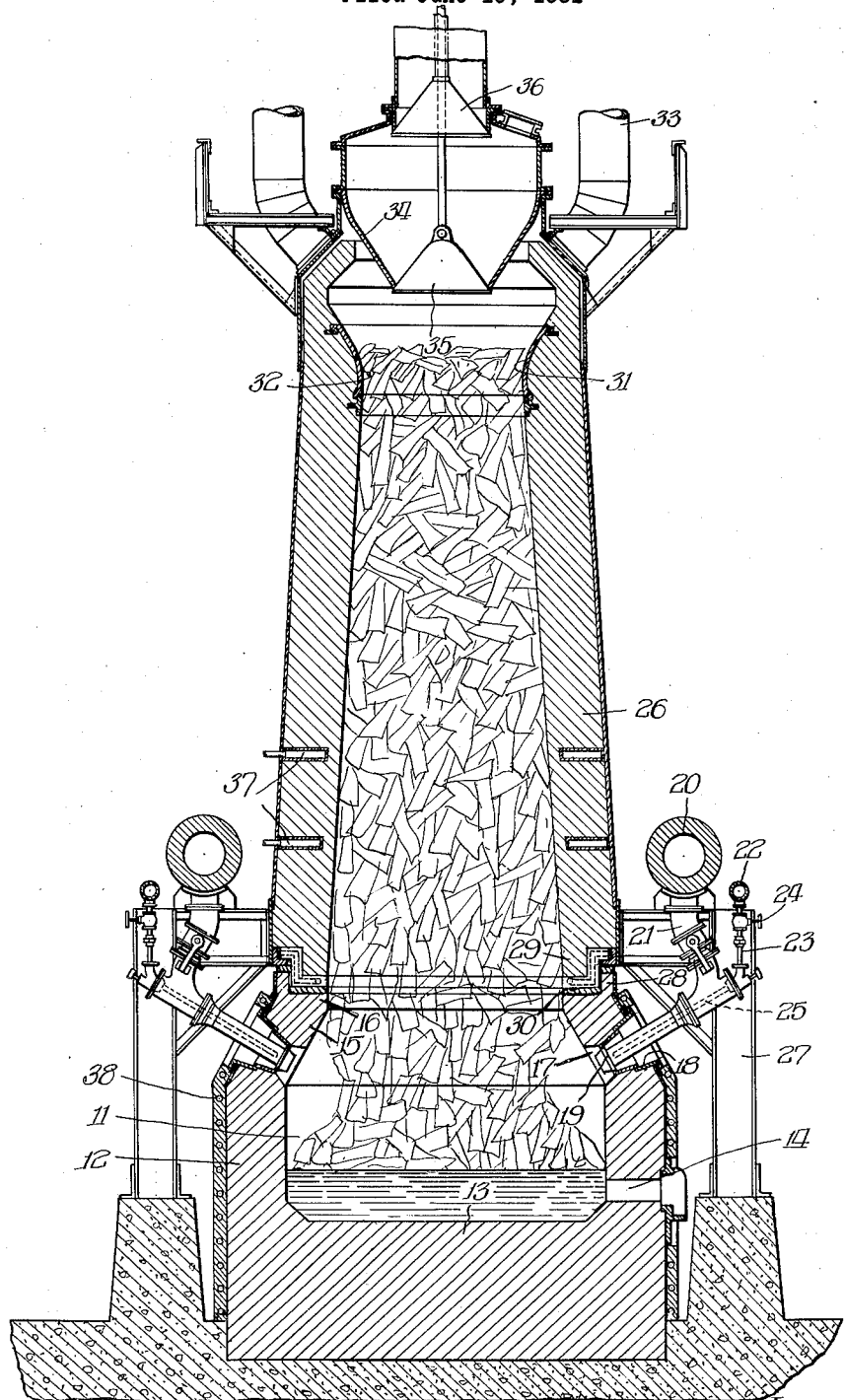
Inventor:
Herman A. Brassert,
By Wilkinson Huxley Byron & Knight
attys.

Patented Feb. 27, 1934

1,948,695

UNITED STATES PATENT OFFICE 1,948,695

METHOD AND APPARATUS FOR THE PRODUCTION OF MOLTEN STEEL

Herman A. Brassert, Chicago, Ill., assignor to H. A. Brassert & Company, Chicago, Ill., a corporation of Illinois Application June 15, 1931. Serial No. 544,492

2 Claims. (Cl. 75—14)

This invention relates to a new and improved method and apparatus for the production of molten steel and more particularly for the melting of steel scrap without materially increasing its carbon content.

At the present time steel scrap is usually melted in an open hearth or electric furnace. It is well known that both of these types of furnace are inefficient in respect to fuel economy as compared to vertical shaft furnaces operating on the counter-current principle of heat exchange. Additions of steel scrap are often made in iron melting cupolas in order to lower the carbon content of the molten metal. However, the melting of steel scrap in the usual cupola for the purpose of obtaining a liquid charge for the open hearth or electric furnace is uneconomical because the steel scrap during its descent in the cupola in the presence of solid coke absorbs carbon and this carbon has to be removed again in the refining process. The removal of carbon through oxidation in the open hearth or electric furnace is a slow process, requiring much time and, owing to the inefficiency of this type of furnace, a large amount of unnecessary heat. Carbon can be more quickly and cheaply removed in the Bessemer converter but this process is not desirable for many grades of steel.

By my invention I propose to melt steel scrap in a vertical shaft furnace with the use of little or no coke or other solid carbonaceous material. This may be done by applying heat obtained from external combustion, but I prefer to apply the necessary heat through combustion of gaseous or liquid or powdered fuels directly in the hearth. In this manner I may obtain a molten metal containing practically no carbon above that originally contained in the scrap material which is charged at the top. I propose to refine this metal in an open hearth, electric or other type of furnace in which by the addition of ore or other materials the final carbon content may be closely controlled and in which the metal may be refined in respect to other elements. If desired the metal treated in this furnace may be transferred to a second furnace for final refinement.

A suitable combination of units would be a vertical shaft furnace heated by the external combustion of gas, oil or powdered coal, followed by a tilting open hearth furnace heated by gas or other fuel and followed by an electric furnace for final refinement, the metal being transferred from one to the other by gravity or through the usual ladle equipment.

In order to enable proper combustion of injected fuels to take place in the hearth of a shaft furnace, it is necessary to provide sufficient space or voids to allow for free expansion of gases which must take place during combustion. I find that this can be better accomplished by a substantial enlargement of the cross-sectional area of the hearth, as compared to that of the superimposed shaft of the furnace.

It is an object of the present invention to provide a new and improved method for the production of molten steel together with a new and improved furnace for carrying out the method.

It is a further object to provide a method of this character which operates with great heat economy.

It is an additional object to provide a method in which the carbon content of the charge may be maintained or modified as desired by a control of the operation.

It is also an object to provide an apparatus for economically carrying out the method and permitting adequate control of the carbon content of the melt.

Other and further objects will appear as the description proceeds.

I have shown a preferred embodiment of an apparatus for carrying out my invention in the accompanying drawing, the single feature of which is a vertical section through the furnace.

The furnace comprises a hearth portion 11 having vertical walls 12 and a closed bottom 13. The notch 14 serves to draw off the molten metal. The walls 12 have upper portions 15 which incline inwardly, and a short uppermost section 16 which is substantially cylindrical in interior contour. The inclined portions 15 are provided with tuyère openings 17 which may carry usual water cooled metal tuyère members 18 for maintaining the openings. The burners 19 extend through the tuyère openings 17 and in the type shown, are adapted to burn a mixture of gas or liquid fuel and air. The air is introduced through the main or bustle pipe 20 and down through the passage 21 to the burner 19. The gaseous or liquid fuel is introduced through the pipe 22 and down through pipe 23 controlled by the valve 24 to the inner pipe 25 of the burner, shown in broken lines in the drawing.

The upper shaft section 26 of the furnace is supported independently of the base or hearth section by means of the structural steel framework 27. Thus variations in expansion, due to heat changes, do not affect the support of the shaft on the hearth or affect the connection between the two. The lower or hearth section is provided with a circular flange 28 which encloses a depending flange 29 on the shaft section, thus forming a slip joint allowing for relative movement. This joint is shown as sealed with an asbestos or similar heat resistant packing 30.

The shaft section tapers inwardly toward the top, the batter of the walls, as shown, being approximately ¾ of an inch for each foot of height of the shaft. The stock line of the shaft furnace is protected by plates 31. The furnace is formed so that the interior of the shaft section is at a minimum diameter at a point 32, which is below the normal line of the top of the stock in the furnace. This produces a greater area of stock where the gases leave the stock and results in decreased velocity at this point and consequently in less carrying away of the fine material.

The products of combustion pass off from the top of the furnace through the passages 33. The furnace is charged through the hopper 34, the lower end of which is closed by the vertically movable bell 35. The material is charged into the hopper 34 through the upper bell 36. The shaft section is shown as provided with water cooled plates indicated at 37 and the hearth is water cooled by the housing 38.

Due to the gradually increasing area of the shaft portion there is no tendency for the charge to hang in the furnace and it descends as the lower portion of the charge is melted in the hearth section. Also, due to the particular taper used, the material lies closely against the walls and any tendency for the gases to channel along the walls is reduced. Due to the increased flare or taper of the upper hearth section 15, the material will not be in contact with the wall at this point and there will be a space between the wall and material in which combustion may take place and the gases may circulate so as to enter the column of material from all sides.

It will be understood that a plurality of tuyères or burners will be used, preferably six or eight uniformly spaced around the circumference.

The shaft of the furnace may be cylindrical but preferably should be cone shaped with sufficient batter to permit of the free descent of the charge and avoiding undue friction on the walls. This batter preferably should be from ½ to 1 inch to the foot. A larger batter will cause too much of the gases to go up on the walls and a smaller batter will cause the charge of the scrap to stick and pack on the walls, inviting the hanging up of the entire charge. My hearth is preferably dome shaped, the walls of the hearth being vertical at the bottom and sloping into a straight dome at the top. A curved dome can also be used if desired. Both the vertical and the sloped sections of the hearth are water cooled, as for example, by the insertion of cooling elements into the brick lining by water cooled housings or by sprays being applied to the outer shell.

The furnace may be made circular, square or rectangular, the circular form being preferred. In order to distribute the injected fuel uniformly over the circumference or perimeter of the hearth, I provide a number of water cooled tuyères, preferably made of copper, aluminum or other suitable material, through which the air and gases or liquid fuels, powdered coal are injected radially or tangentially. The air is preferably preheated to a high degree by the use of regenerative or recuperative stoves. I have found by experience that it is impossible to maintain such tuyères under the conditions of extreme heat resulting from combustion with preheated air if molten steel is allowed to come in contact with the surfaces of these tuyères. For that reason I insert the tuyères through the upper and outwardly sloping portion of the hearth which will insure their being at all times above any of the melting or molten steel scrap which accumulates on the bottom of the hearth. The hearth is equipped with one or more tapping holes at its lower level from which the metal and slag may be drawn off periodically or continuously as desired.

In the use of this furnace to carry out my method, the melting is performed in the hearth by the combustion of external fuel injected into said hearth. This method prevents the absorption of carbon by the steel scrap which invariably takes place by the present method of melting steel scrap in a blast furnace or cupola furnace in which coke is charged together with the scrap.

The resulting molten scrap I tap off at intervals, or continuously, preferably at intervals, but I also may do so continuously and run it directly, or through ladles, into a relatively small tilting furnace or electric furnace. In this furnace the metal may be refined through proper additions and heat treatment, or it may be merely prepared to a uniform physical and chemical quality for final treatment in an electric furnace. The refinement of the molten scrap cast from the vertical shaft furnace, containing no more carbon than the original charge, is a matter of only a few hours and requires a relatively small amount of external heat. The total heat consumption of melting the cold scrap and refining in the manner described is theoretically only 50% of that required by the open hearth process.

My method provides a new and efficient means of regulating the carbon content of a melt of steel scrap. If a lower carbon content is desired in the melt than that contained in the charge, an oxidizing flame may be used which is obtained by increasing the ratio of air to fuel in the burners. Contrariwise, if a higher carbon content is desired in the melt than that of the charge, then a reducing flame is used, obtained by decreasing the ratio of air to fuel to the required extent. If the carbon of the melt is to be approximately the same as in the charge, then a neutral flame will give the best results.

Another method of decreasing the carbon content in the melt from the vertical shaft furnace is to add ore to the charge, whereby the oxygen required for elimination of carbon will be derived from the ore rather than from excess oxygen in the blast air for combustion. This method is highly economical in that the ore is preheated by the counter-current principle of heat interchange; whereas in the present open hearth process such iron ore is added cold into the molten bath, a most inefficient procedure both from the standpoint of heat economy and the cost of handling.

It will be seen that I propose to use the more economical methods which cannot be done if the steel scrap is melted in an open hearth furnace by itself or together with molten pig iron. The fuel economy by the proposed method is such that in a plant producing its steel from a charge of 50% of molten pig iron and 50% of steel scrap, which is the usual proportion at most steel works, it can save approximately 40% of the total fuel required to produce a ton of steel, the electric power consumed being figured at its equivalent of fuel. The consumption of electric power at the average steel plant for the melting of steel is advantageous due to the utilization of surplus blast furnace gas and due to the favorable power factor which is thereby established.

What makes this new method possible is my invention of a method of melting scrap by the counter-current principle of heat exchange without the use of coke or other solid fuel as a part of a charge, thereby preventing the carbonization of the steel scrap. The furnace used for this purpose must be of a special design in order to make this melting process possible and to this means I have invented the furnace described, in which the scrap is charged at the top, descends through the shaft, and is heated by the counter-current principle of heat exchange. At the lower end of the shaft, already heated to a high degree of temperature, the scrap descends into the hearth. This hearth is preferably wider than the shaft in order to produce the voids which are necessary for combustion of the fuel which is injected into the hearth together with the air for proper combustion. The widening out of the hearth fulfills two purposes, one is to permit the unrestricted complete combustion of the fuel and the other is to prevent molten steel melting or molten steel scrap from coming into contact with the water cooled tuyères through which fuel and air are injected, and which would be instantly destroyed by such contact.

The particular form of furnace shown and the specific method of carrying out my invention which have been described, are to be understood as illustrative only, as they are both capable of change and variation to meet different conditions and requirements, and I contemplate such changes and modifications as come within the spirit and scope of the appended claims.

I claim:

1. The method of producing steel, which comprises melting steel scrap in a vertical shaft furnace solely by means of fuel injected into the furnace and burned out of contact with the scrap whereby the scrap is maintained free of contact with carbonaceous fuels, transferring the molten steel to a second furnace, and treating and refining said steel in the second furnace.

2. The method of producing steel, which comprises melting steel scrap in a vertical shaft furnace by means of fuel injected into the furnace and burned out of contact with the scrap whereby the scrap is maintained free of contact with carbonaceous fuels, transferring the molten steel to an electric furnace, and treating and refining said steel in the electric furnace.

HERMAN A. BRASSERT.